3,018,206
FIRE-RESISTANT DECORATED COMPOSITE LAMINATE MEMBERS AND METHOD OF PRODUCING SAME

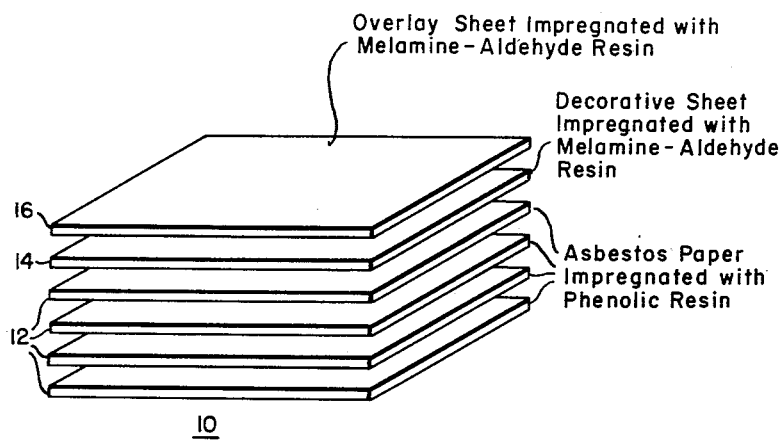

William C. Hood, Varnville, and David E. Baldwin, Hampton, S.C., assignors to Westinghouse Electric Corporation, East Pittsburgh, Pa., a corporation of Pennsylvania
Filed Dec. 31, 1957, Ser. No. 706,348
5 Claims. (Cl. 154—45.9)

This invention relates to composite laminate members and particularly to composite decorated laminate members having good fire-resistance and to the method of producing same.

Decorated laminate members have enjoyed widespread use in the building industry, especially as decorative wall panels, ceiling panels and the like. Many applications require that the decorative panels be fire-resistant. This is particularly true when the decorative panels are used as bulkhead construction in ships, and wall construction in hospitals, office buildings and the like. Heretofore, attempts have been made to produce fire-resistant decorated laminate members, however, the laminates have not possessed adequate physical strength and other desirable physical properties. Attempts to improve physical properties have resulted in a considerable reduction in fire-resistance to a point where the material could not be classified as fire-resistant. It is highly desirable to have available in the art decorated laminate members that have good fire-resistance and high physical strength.

The object of this invention is to provide composite decorated laminates comprising sheet fibrous material impregnated and bonded together by thermoset resinous compositions, which laminates have good fire-resistance and high physical strength.

Another object of this invention is to provide a method for producing decorated laminates of high physical strength and good fire-resistance.

Other objects of this invention will, in part, be obvious and will, in part, appear hereinafter.

For a better understanding of the nature and objects of the invention, reference should be had to the following detailed description and drawing in which the single FIGURE is a schematic view of an assembly of sheets in accordance with this invention.

In accordance with this invention a decorated composite laminate member is prepared which has good fire-resistance and high physical strength. The composite laminate member comprises a core or body layer comprising a plurality of sheets of asbestos paper impregnated with a phenolic condensation product and a decorated surface layer impregnated with a clear melamine-aldehyde resin.

The decorated laminate members of this invention will usually be adhesively bonded to a rigid backing sheet of fire-resistant material having a thickness of from about ¼ inch to 1 inch to provide suitable fire-resistant panels. The panels thus produced are well suited for structural materials for the marine industry, hospitals and the like where fireproof structures are required. An example of a suitable rigid backing material is that available commercially under the proprietary name Marinite. The adhesive composition employed is preferably a fire-resistant type such as the silicon type adhesives.

The decorated surface layer may comprise a sheet of alpha-cellulose paper, thin cotton fabric, silk, glass fabric, asbestos paper or like fibrous sheet material with a design imprinted thereon or the sheet may be pigmented throughout. Pigmented sheets with designs imprinted thereon may also be employed. Ordinarily, a resin impregnated protective overlay sheet is employed over sheets having designs imprinted thereon to provide better abrasion resistance and good surface appearance thereto. Pigmented sheets that have no design imprinted thereon will ordinarily have good abrasion resistance and hence an overlay sheet is not required. Suitable materials for overlay sheets include rayon, glass fabric and alpha-cellulose paper. In accordance with this invention, when an overlay sheet is employed, it will be impregnated with a clear melamine-aldehyde resin.

Any commercially available asbestos paper sheeting such, for example, as that available under the proprietary name Novabestos, may be employed in preparing the laminates of this invention.

Sheets of asbestos paper are impregnated with any well known conventional thermosetting phenolic resin prepared by reacting phenol, cresol, or cresylic acid with formaldehyde, paraformaldehyde or other polymers of formaldehyde, ordinarily in the presence of an alkaline catalyst such as ammonia, sodium hydroxide, lime, or barium hydroxide. A volatile solvent such as ethyl alcohol, toluene or xylene is added to the resin to produce an impregnating varnish. The resin solids content of the varnish may be varied from about 20% to 60% by weight.

A suitable resin may be prepared by reacting 1 mol of phenol and from 0.9 to 1.7 mols of formaldehyde in a closed reaction vessel under reflux conditions for at least 1 hour, the reaction being catalyzed by an alkaline catalyst such as ammonia and then vacuum dehydrated at a temperature not exceeding 100° C.

Example I

The following is an example of the preparation of a partially reacted thermosettable phenolic resin that may be employed in carrying out this invention:

Into a steam heated reaction kettle there are introduced the following:

| | Parts by weight |
|---|---|
| Phenol | 110 |
| Formaldehyde (37%) | 104 |
| Ammonia (28%) | 3.75 |

These materials are reacted in the steam heated reaction vessel at a temperature of approximately 100° C. under reflux conditions for a period of about 1½ hours. The mixture is then dehydrated under a vacuum of 28 inches of mercury, and the temperature gradually increased to approximately 75° C. during dehydration. Substantially all the water is removed. To the hot reaction product there is added 81.5 parts by weight of 95% ethyl alcohol and the resulting resin varnish is then permitted to cool to room temperature. This resin varnish has a viscosity of from 180 to 400 centipoises at 25° C. and a set time of from 13 to 16.5 minutes at 153.5° C.

Another particularly good resin composition that may be employed in impregnating the sheets of asbestos paper is a dicyandiamide-phenol-formaldehyde resin composition. Such a resinous composition is derived by reacting phenol, dicyandiamide and formaldehyde in the proportions of 1 mol of the phenol, from 0.8 to 2 mols of dicyandiamide and from 0.9 to 1.5 mols of formaldehyde per mol of the combined phenol and dicyandiamide. Water is present, being usually furnished as a part of aqueous formaldehyde solution (37% to 40%), and amounting to at least 10% of the weight of the reactants, and ordinarily should not exceed the weight of the reactants. The mixture is reacted under alkaline conditions for at least ½ hour, and preferably by refluxing from 1 to 2 hours, and then is vacuum dehydrated at a temperature not exceeding 100° C. until substantially all of the water is removed and then a volatile solvent is applied to produce an impregnating varnish.

The resin varnish employed to impregnate the asbestos paper sheets may include a small proportion, of the order of 2% to 10% by weight, of finely divided inorganic solids such as silica, aluminum oxide, antimony oxide and the like refractory solids to impart better flame resistance to the final product.

The following example is illustrative of the method of preparation of a suitable dicyandiamide-phenol-formaldehyde resin for use in this invention.

*Example II*

Into a steam heated reaction kettle there are introduced the following:

| | Parts by weight |
|---|---|
| Phenol | 2750 |
| Dicyandiamide | 2100 |
| Formaldehyde (37%) | 4620 |
| Ammonia (28%) | 166 |

The ammonia and the formaldehyde are admixed before being introduced into the kettle with the remainder of the ingredients, the mixture having a pH of approximately 8.5. The mixture is slowly heated, and at 80° C. an exothermic reaction takes place that carries the temperature to approximately 95° C. Additional heat is then supplied in order to cause the reaction mixture to reflux. The mixture is refluxed for 90 minutes and then dehydrated under a vacuum of 27 inches of mercury, and the temperature gradually increased to approximately 75° C. during dehydration. Substantially all the water is removed. To the hot reaction product there are added 2000 parts by weight of 95% ethanol, and the resulting thick varnish is cooled to room temperature. The resinous reaction product is then further diluted with a mixture comprising 50% by weight of ethanol and 50% by weight of water to produce an impregnating varnish comprising approximately 53% by weight of resin solids. The viscosity of the composition is approximately 250 centipoises at 25° C.

Particularly good results have been obtained by impregnating sheets of asbestos paper with a mixture of from 2 parts to 4 parts by weight of a conventional phenolic resin and 1 part by weight of a dicyandiamide-phenol-formaldehyde resin dissolved in a suitable solvent such as ethyl alcohol to provide a varnish composition having from 20% to 60% resin solids.

The following example is illustrative of a suitable mixture to be employed in carrying out this invention.

*Example III*

Three parts by weight of the resinous reaction product of Example I and one part by weight of the resinous reaction product of Example II and 15 parts by weight of 95% ethyl alcohol are thoroughly admixed by agitation to form an impregnating resinous varnish composition. This resin varnish has a viscosity of from 60 to 150 centipoises at 25° C. and a set time of from 13.5 to 17.5 minutes at 153.5° C.

The sheets of asbestos paper may be impregnated with the resin varnish composition of this invention in any conventional manner, for example, as described in the patent to Weltman et al., Patent No. 2,579,637. It is important, for the purposes of this invention to employ a resin ratio of the impregnant within the relatively narrow range of from 1.35 to 1.80. Resin ratio is defined as the ratio of the weight of the untreated fabric plus the weight of the resin that is impregnated in the sheet to the weight of the untreated fabric. In other words, the treated fibrous material carries resin in an amount equal to from 35% to 80% of the fibrous material alone. To achieve the ultimate in fire-resistance the very minimum amount of resin is desired; however, to obtain desired physical properties, such as good moisture resistance, good dimensional stability, good impact strength and the like, a somewhat greater amount of resin content is desired.

Thus, asbestos paper sheeting is dipped in the varnish one or more times until it has picked up resin solids in an amount of from 0.35 to 0.80 times the weight of the dry asbestos paper and the varnish impregnated asbestos paper is passed through an oven or other dryer after each dip to remove the volatile solvent. During drying, it is desirable to heat the asbestos paper treated with the varnish composition at a temperature of from 110° C. to 160° C. in order to remove the solvent therefrom promptly and to advance the cure of the resin well into the "B" stage. The heat treatment of the applied resin at this stage is conducted so that the resulting treated fabric has a "greenness" of from 0.3% to 6%. The greenness is determined by placing a stack of small pieces of the resin treated sheet material in a hot press and pressing it at a temperature of 175° C. and a pressure of 1000 pounds per square inch for 5 minutes, and then measuring the amount of resin that is forced out of the stack, that is, the resin that extends beyond the fibrous sheet material proper, and determining the proportion of this exuded resin to the total weight of the sample.

It is also essential that the greenness be controlled and kept within the above limits. It is important to have adequate greenness so that a homogeneous laminate is obtained. However, if the greenness is too high, a bursting of the asbestos fibers is encountered during laminating process and the resin tends to flow into the decorated layer causing a discoloration of same. Details of the laminating procedure will be set forth hereinafter.

The decorated sheet material and protective overlay, if one is employed, are impregnated with at least 50% of their weight with a clear thermosetting melamine-aldehyde resin. It will be appreciated that in many cases, the melamine-formaldehyde resin have been made in the presence of butanol and that they comprise butylated polymers. The terms "melamine-aldehyde" are intended to apply to such compositions which comprise essentially these reactants as the main ingredients but may contain other ingredients such as sulfonamides, glycols, glucosides and the like which are added to provide special properties such as flexibility, craze-resistance and the like. The manufacture of the melamine-aldehyde resins suitable for the practice of the present invention is well known in the art and need not be detailed herein.

Referring to the single figure of the drawing, there is shown a stack 10 which comprises sheets 12 of asbestos paper impregnated with B-stage phenolic resin, decorated sheet 14 and protective overlay sheet 16 both of which are impregnated with B-stage melamine-aldehyde resin.

The stock 10, as shown in the figure of the drawing is introduced into a molding press where the stack is subjected for a specified period of time to a temperature of from about 260° F. to 320° F., while under pressure. Pressures of from 500 p.s.i. to 1500 p.s.i. are satisfactory, while pressures of from 1000 p.s.i. to 1200 p.s.i. give best results. The curing cycle must be closely controlled so that adequate and complete cure of the melamine-aldehyde resin and the phenolic resin will be effected. Adequate curing of the resin components is obtained in about 15 minutes to 25 minutes at a temperature of from about 260° F. to 300° F.

The following examples illustrate the preparation of composite decorated laminate members in accordance with this invention.

*Example IV*

Eight sheets of asbestos paper (12 inches x 12 inches x 0.010 inch) are impregnated with the phenolic resin varnish of Example I, to a resin ratio of about 1.60 and a greenness of about 1.0% and the solvent removed. One sheet (12 inches x 12 inches x 0.010 inch) of pigmented alpha-cellulose paper is impregnated with melamine-aldehyde resin varnish to provide a resin ratio of about 2.20 and the solvent removed. A stack was prepared by superimposing one sheet of impregnated asbestos paper on the other and the impregnated pigmented sheet placed on the top of the stacked asbestos sheets. The stack is consolidated or molded into a composite laminated member at a pressure of 1000 p.s.i. and at a temperature of about 280° F. for a period of about 19 minutes. The resulting laminate has good surface characteristics, good physical properties and good fire-resistance.

*Example V*

Ten sheets of asbestos paper (12 inches x 12 inches x 0.010 inch) are impregnated with the phenolic resin varnish of Example II, to a resin ratio of about 1.60 and a greenness of about 1.0% and the solvent removed. One sheet (12 inches x 12 inches x 0.010 inch) of pigmented alpha-cellulose paper is impregnated with melamine-aldehyde resin varnish to provide a resin ratio of about 2.00 and the solvent removed. In accordance with the method of Example IV a composite decorated laminate member is prepared. This laminate has good surface quality, excellent fire-resistance, and high physical strength.

*Example VI*

Six sheets of asbestos paper (12 inches x 12 inches x 0.010 inch) were impregnated with the phenolic resin varnish of Example III, to a resin ratio of about 1.60 on a greenness of 1% and the solvent removed. One sheet (12 inches x 12 inches x 0.010 inch) of pigmented alpha-cellulose paper having a design imprinted thereon and one sheet (12 inches x 12 inches x 0.010 inch) of rayon fabric are impregnated with melamine-aldehyde resin varnish and the solvent removed. The sheet of alpha-cellulose paper is provided with a resin ratio of about 1.70 and the rayon sheet with a resin ratio of about 3.00. A stack is assembled by superimposing one sheet of impregnated asbestos paper on the other. The sheet of pigmented alpha-cellulose paper is placed on top of the stack and the rayon sheet is placed on top of the pigmented sheet. In accordance with the method of Example IV a composite decorated laminate member is prepared. This decorated laminate member is adhesively bonded to a one inch thick sheet of Marinite by using a heat resistant adhesive composition to produce a composite member. This composite member was tested using the Underwriters' Laboratories, Inc., test entitled "Tunnel Test for Fire Resistance of Building Materials." The following results were obtained:

Rate of flame spread _____ 15
Fuel contributed _____ 15
Smoke developed _____ 0

It will be understood that the above examples and description and drawing are illustrative and not in limitation of the invention.

We claim as our invention:
1. In the process of preparing a fire-resistant decorated composite laminate member, the steps comprising (1) impregnating asbestos paper sheeting with a solution of a thermosettable resinous composition consisting of (A) from 2 parts to 4 parts by weight of a phenolic resin derived by reacting 1.0 mol of a phenol and from 0.9 mol to 1.7 mols of formaldehyde under reflux conditions for at least one hour, the reaction being catalyzed with an alkaline catalyst, and then vacuum dehydrated at a temperature not exceeding 100° C. and (B) one part by weight of the resinous reaction product derived by reacting one mol of a phenol, from 0.8 mol to 2.0 mols of dicyandiamide, and from 0.9 mol to 1.5 mols of formaldehyde per mol of the combined phenol and dicyandiamide in the presence of water, the mixture being refluxed for at least ½ hour, and then vacuum dehydrated at a temperature not exceeding 100° C., the resin impregnated sheet fibrous material being heated to drive off the solvent and to advance the cure of the resin to a condition where its greenness is from 0.3% to 6%, the asbestos paper sheeting carrying from 0.35 to 0.80 times its weight of the resin after drying, (2) superimposing a plurality of layers of the resin treated asbestos paper sheeting to provide a stack, (3) superimposing a decorated sheet of fibrous material impregnated with a potentially thermosettable clear melamine-aldehyde resin on top of the stack to provide a composite member, and (4) molding the composite member at a pressure of from 500 to 1500 pounds per square inch at temperature of from 135° C. to 165° C.

2. The process of claim 1 wherein a protective overlay sheet of fibrous material impregnated with a potentially thermosettable clear melamine-aldehyde resin is superimposed on top of the impregnated decorated sheet prior to molding.

3. A fire-resistant decorated composite laminate member comprising (A) a surface layer comprising a decorated sheet of fibrous material impregnated with a thermoset melamine-aldehyde resin and (B) a body layer comprising a plurality of sheets of asbestos paper impregnated with a thermoset resin composition comprising from 35% to 80% of the weight of the asbestos paper alone, the thermoset resin composition consisting of (1) from 2 parts to 4 parts by weight of a phenolic resin derived by reacting 1.0 mol of a phenol and from 0.9 mol to 1.7 mols of formaldehyde under reflux conditions for at least 1 hour, the reaction being catalyzed with an alkaline catalyst, and then vacuum dehydrated at a temperature not exceeding 100° C. and (2) one part by weight of the resinous reaction product derived by reacting one mol of a phenol, from 0.8 to 2.0 mols of dicyandiamide, and from 0.9 mol to 1.5 mols of formaldehyde per mol of the combined phenol and dicyandiamide in the presence of water, the mixture being refluxed for at least ½ hour, and then vacuum dehydrated at a temperature not exceeding 100° C., the said decorated sheet and asbestos sheets being consolidated and bonded together into a unitary member.

4. A thermosettable resinous composition consisting of (1) from 2 parts to 4 parts by weight of a phenolic resin derived by reacting 1.0 mol of a phenol and from 0.9 mol to 1.7 mols of formaldehyde under reflux conditions for at least one hour, the reaction being catalyzed with an alkaline catalyst, and then vacuum dehydrated at a temperature not exceeding 100° C., and (2) one part by weight of the resinous reaction product derived by reacting one mol of a phenol, from 0.8 mol to 2.0 mols of dicyandiamide, and from 0.9 mol to 1.5 mols of formaldehyde per mol of the combined phenol and dicyandiamide in the presence of water, the mixture being refluxed for at least ½ hour, and then vacuum dehydrated at a temperature not exceeding 100° C.

5. A resinous impregnating varnish composition consisting of (1) from 2 parts to 4 parts by weight of a phenolic resin derived by reacting one mol of a phenol and from 0.9 mol to 1.7 mols of formaldehyde under reflux conditions for at least 1 hour, the reaction being catalyzed with an alkaline catalyst and then vacuum dehydrated at a temperature not exceeding 100° C. (2) one part by weight of a resinous reaction product derived by reacting 1 mol of a phenol, from 0.8 to 2.0 mols of dicyandiamide, and from 0.9 mol to 1.5 mols of formaldehyde per mol of the combined phenol and dicyandiamide in the presence of water, the mixture being refluxed for at least ½ hour, and then vacuum dehydrated at a temperature not exceeding 100° C., and (3) a solvent therefor.

References Cited in the file of this patent
UNITED STATES PATENTS

| | | |
|---|---|---|
| 2,439,929 | Hill et al. | Apr. 20, 1948 |
| 2,604,427 | Armstrong et al. | July 22, 1952 |
| 2,732,325 | Lindenfelser et al. | Jan. 24, 1956 |
| 2,740,737 | Elmer et al. | Apr. 3, 1956 |
| 2,801,198 | Morris et al. | July 30, 1957 |
| 2,801,672 | Baldwin et al. | Aug. 6, 1957 |
| 2,824,849 | Boiney | Feb. 25, 1958 |